United States Patent
Kim (10) Patent No.: US 8,861,503 B2
(45) Date of Patent: Oct. 14, 2014

(54) METHOD AND SYSTEM FOR SYNCHRONIZING DATA BETWEEN MOBILE TERMINAL AND INTERNET PHONE

(75) Inventor: Hyo Jin Kim, Daegu Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 12/624,769

(22) Filed: Nov. 24, 2009

(65) Prior Publication Data

US 2010/0128714 A1 May 27, 2010

(30) Foreign Application Priority Data

Nov. 26, 2008 (KR) ........................ 10-2008-0118086

(51) Int. Cl.
*H04W 4/00* (2009.01)
*H04J 3/06* (2006.01)
*H04L 12/58* (2006.01)
*H04L 29/08* (2006.01)
*H04L 29/12* (2006.01)

(52) U.S. Cl.
CPC ............ *H04L 67/1095* (2013.01); *H04L 51/28* (2013.01); *H04L 61/1541* (2013.01); *H04L 29/12783* (2013.01); *H04L 61/35* (2013.01); *H04L 29/12113* (2013.01); *H04L 51/38* (2013.01)
USPC ............................ 370/350; 370/328; 370/503

(58) Field of Classification Search
None
See application file for complete search history.

(56) References Cited

U.S. PATENT DOCUMENTS

| | | | |
|---|---|---|---|
| 2003/0018814 A1* | 1/2003 | Kao et al. | 709/245 |
| 2003/0046328 A1* | 3/2003 | Goo et al. | 709/200 |
| 2004/0209614 A1* | 10/2004 | Bright et al. | 455/426.1 |
| 2006/0178133 A1 | 8/2006 | Kim | |
| 2007/0014314 A1* | 1/2007 | O'Neil | 370/503 |
| 2007/0019635 A1* | 1/2007 | McMenamy | 370/356 |
| 2007/0250607 A1 | 10/2007 | Jung et al. | |
| 2008/0317038 A1* | 12/2008 | Pasko et al. | 370/395.5 |

FOREIGN PATENT DOCUMENTS

| | | |
|---|---|---|
| KR | 2002-0036136 A | 5/2002 |
| KR | 10-2006-0089805 A | 8/2006 |
| KR | 10-2007-0103668 A | 10/2007 |

* cited by examiner

*Primary Examiner* — Faruk Hamza
*Assistant Examiner* — Diane Lo
(74) *Attorney, Agent, or Firm* — Jefferson IP Law, LLP (57) ABSTRACT

A method and system for synchronizing data between a mobile terminal and an Internet phone is provided. The method includes transmitting an Internet Protocol (IP) address request message from a mobile terminal to an Internet phone, transmitting an IP address response message from the Internet phone to the mobile terminal in response to the IP address request message, establishing a connection between the mobile terminal and the Internet phone using the IP address, and performing data synchronization between the mobile terminal and the Internet phone through the connection.

27 Claims, 4 Drawing Sheets

METHOD AND SYSTEM FOR SYNCHRONIZING DATA BETWEEN MOBILE TERMINAL AND INTERNET PHONE

PRIORITY

This application claims the benefit under 35 U.S.C. §119 (a) of a Korean patent application filed in the Korean Intellectual Property Office on Nov. 26, 2008 and assigned Serial No. 10-2008-0118086, the entire disclosure of which is hereby incorporated by reference.

BACKGROUND OF THE INVENTION

1. Field of the Invention

The present invention relates to data synchronization. More particularly, the present invention relates to a method and system for synchronizing data between a mobile terminal and an Internet phone that enables the mobile terminal to acquire an Internet Protocol (IP) address of the Internet phone and perform a data synchronization procedure using the IP address of the Internet phone.

2. Description of the Related Art

Mobile terminals vendors have their own proprietary technologies and solutions for performing data synchronization. The proprietary technologies and solutions only function with vender-specific devices and data types. Accordingly, it is difficult to connect and synchronize different vendors' products to each other without using converters specifically designed. The vendor-specific data synchronization protocols functions as an obstacle to pervasive mobile computing, e.g., restricts the mobility of user and data access and exchange. Accordingly, a need exists for a standardized common data synchronization protocol that can be used for all types of devices and servers. Synchronization Markup Language (SyncML) is an open data synchronization protocol to synchronize user data, such as task lists, address books, contacts, Electronic mail (E-mail), and personal notes, by means of a database located in a network.

Data synchronization is a process of establishing consistency among data (i.e., source data and target data) stored in more than two logical devices. Personal Information Management (PIM) is a well-known tool for organizing personal information including task lists, address books, contacts, E-mail, personal notes, and the like. A procedure of PIM information is described in more detail with reference to FIGS. 1A and 1B.

Figure 1A:
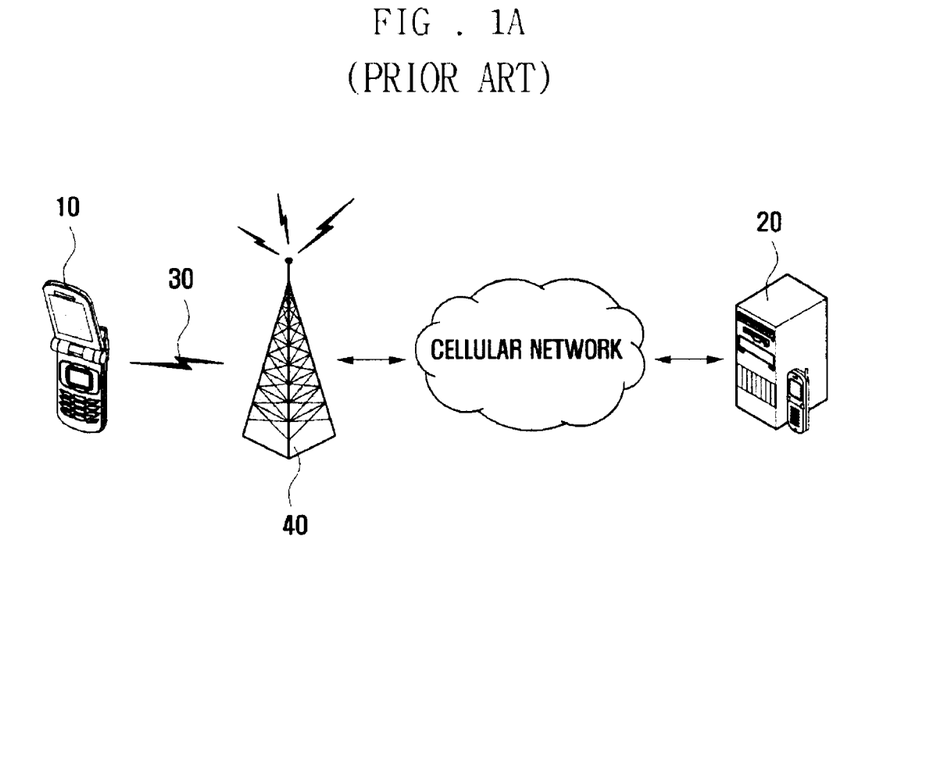
FIGS. 1A and 1B are schematic diagrams illustrating conventional data synchronization systems.
Figure 1B:
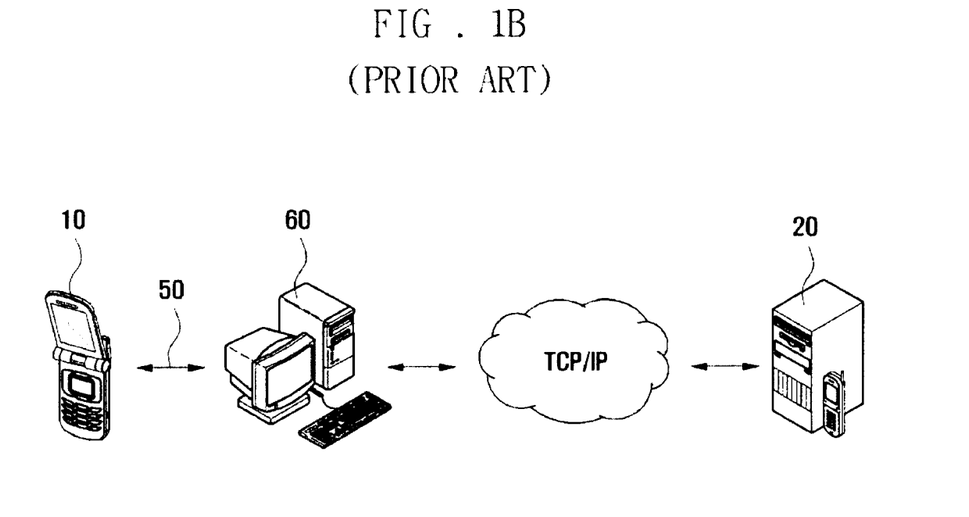

FIGS. 1A and 1B are schematic diagrams illustrating conventional data synchronization systems.

Referring to FIGS. 1A and 1B, two exemplary system architectures for data synchronization with a SyncML function are illustrated. A data synchronization system can be composed of a mobile terminal 10 and a PIM server 20. The mobile terminal 10 can be any of devices supporting mobility.

A user can update or change the PIM information by means of the mobile terminal 10. When it is required to synchronize the PIM information stored in the PIM server 20 with the PIM information updated at the mobile terminal 10, the mobile terminal 10 transmits the updated PIM data to the PIM server 20 using the SyncML function. The PIM server 20 receives the PIM information transmitted by the mobile terminal 10 and updates previously stored PIM information within a database. That is, the PIM server 20 updates the database of a corresponding user with the PIM information transmitted by the mobile terminal 10.

In order to exchange data between the mobile terminal 10 and the PIM server 20 using the SyncML function, the mobile terminal 10 can establish a communication link to the PIM server 20 via a mobile communication network by accessing a base station 40 as illustrated in FIG. 1A or an Transmission Control Protocol/Internet Protocol (TCP/IP) network with the support of a SyncML gateway 60. In FIG. 1A, the mobile terminal 10 establishes a radio link 30 with the base station.

In FIG. 1B, the SyncML gateway 60 can be a Personal Computer (PC), and the mobile terminal 10 connects to the PIM server 20 via the TCP/IP network. The mobile terminal 200 can be coupled with the SyncML gateway 60 through a wireless or wired communication link 50. The wireless communication link 50 can be established using a short range communication technology such as Infrared Data Association (IrDA) or Bluetooth. The wired communication link 50 can be established using a Universal Serial Bus cable. The SyncML gateway 60 and the PIM server 20 communicate with each other using the TCP/IP.

Recently, a widespread use of the Internet has increased the use of Internet telephony. An Internet phone functions similar to the mobile terminal, and thus it is not difficult to share data between the mobile terminal and the Internet phone. In such cases, data synchronization is essentially required.

In order to synchronize the data between the mobile terminal and the Internet phone, the mobile terminal accesses the PIM server via the mobile communication network or an IP network, and the Internet phone accesses the PIM server via the IP network such that the PIM server maintains most recently updated data and provides the mobile terminal and the Internet phone with the updated data when requested.

In the conventional data synchronization method, the PIM server is involved in the synchronization procedure between the devices and when using the Internet, the Internet phone must be connected to the SyncML gateway. Since the conventional data synchronization method requires access to an external server and an authentication process per device, the synchronization procedure is complex and time consuming. Also, when providing synchronization of a small amount of data, processing complexity costs are increased.

Therefore, a need exists for a method and system for simplifying data synchronization between a mobile terminal and an Internet phone.

SUMMARY OF THE INVENTION

An aspect of the present invention is to address at least the above-mentioned problems and/or disadvantages and to provide at least the advantages described below. Accordingly, an aspect the present invention is to provide a method and system for synchronizing data between a mobile terminal and an Internet phone without compromising network environment and resources.

Another aspect of the present invention is to provide a data synchronization method and system that enables a mobile terminal to access an IP address allocated to an Internet phone and synchronize data between the mobile terminal and the Internet phone in a simple and direct manner.

Still another aspect of the present invention is to provide a data synchronization method and system for facilitating data synchronization between a mobile terminal and an Internet Protocol (IP) phone simply and quickly by enabling a mobile terminal to acquire the IP address of a mobile terminal through a predefined message exchange and share data between the mobile terminal and the Internet phone using the IP address.

Yet a further aspect of the present invention is to provide a data synchronization method and system for synchronizing data between a mobile terminal and an Internet phone by enabling the mobile terminal and the Internet phone to share an IP address of the Internet phone.

Another aspect of the present invention is to provide a method and system for synchronizing data between a mobile terminal and an Internet phone that enables the mobile terminal to acquire a static/dynamic IP address of the Internet phone and for sharing data using the IP address.

Still another aspect of the present invention is to provide a method and system for synchronizing data between a mobile terminal and an Internet phone that enables the mobile terminal to acquire a static/dynamic IP address of the Internet phone from a network element including a Short Messaging Service (SMS) server and a gatekeeper and for sharing data using the IP address.

Yet a further aspect of the present invention is to provide a method and system for synchronizing data between a mobile terminal and an Internet phone that enables the mobile terminal to acquire a static/dynamic IP address of an IP sharer to which the Internet phone is connected and a port number of the IP sharer allocated to the Internet phone, and for sharing data directly with the Internet phone using the IP address and port number.

Another aspect of the present invention is to provide a method and system for synchronizing data between a mobile terminal and an Internet phone that enables the mobile terminal to acquire a virtual/private IP address of an IP sharer to which the Internet phone is connected and a port number of the IP sharer allocated to the Internet phone and for sharing data directly with the Internet phone using the IP address and port number.

In accordance with an aspect of the present invention, a method for synchronizing data between two logical devices is provided. The method includes transmitting an Internet Protocol (IP) address request message from a mobile terminal to an Internet phone, transmitting an IP address response message from the Internet phone to the mobile terminal in response to the IP address request message, establishing a connection between the mobile terminal and the Internet phone using the IP address, and performing data synchronization between the mobile terminal and the Internet phone through the connection.

The transmitting of the IP address request message may comprise transmitting the IP address request message from the mobile terminal to an Internet phone service network, the transmitting of the IP address response message comprises transmitting the IP address response message including the IP address of the Internet phone from the Internet service network to the mobile terminal, and the establishing of the connection comprises connecting the mobile terminal to the Internet phone using the IP address.

In accordance with another aspect of the present invention, a data synchronization method of a mobile terminal is provided. The method includes transmitting an Internet Protocol (IP) address request message in a predefined format to an Internet phone via a messaging service, receiving an IP address response message in the predefined format in response to the IP address request message, acquiring an IP address of the Internet phone from the IP address response message, connecting to the Internet phone using the IP address, transmitting a data synchronization request message to the Internet phone, and performing a data synchronization procedure with the Internet phone.

In accordance with yet another aspect of the present invention, a system for synchronizing data between two logical devices is provided. The system includes a mobile terminal for transmitting an IP address request message to a destination in response to a synchronization request, for connecting, when the IP address is acquired in response to the IP address request message, to the destination corresponding to the IP address, and for performing a data synchronization procedure with the destination, and a mobile terminal for generating, in response to the IP address request message, an IP address response message including the IP address, for transmitting the IP address response message to the mobile terminal, and for performing the data synchronization procedure with the mobile terminal connected using the IP address.

The system may further include a network for intercepting the IP address request message transmitted by the mobile terminal, for transmitting the IP address response message including the IP address of the Internet phone, and for transmitting a notification message to the Internet phone to inform the Internet phone of a data synchronization request by the mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and system for directly synchronizing data between a mobile terminal and an Internet phone. According to the exemplary embodiments of the present invention, data synchronization between the mobile terminal and the Internet phone is performed without influence of communication environment and network resources.

In an exemplary embodiment of the present invention, the mobile terminal acquires an Internet Protocol (IP) address allocated to the Internet phone through a predefined message exchange and connects to the Internet phone directly using the IP address. After connecting to the Internet phone, the mobile terminal and the Internet phone perform data synchronization using a Synchronization Markup Language (SyncML) protocol.

In an exemplary embodiment of the present invention, the predefined message exchange may be performed using Short Message Service (SMS). For instance, the mobile terminal may transmit a SMS message carrying an IP address request to the Internet phone, and the Internet phone may transmit a SMS message carrying its IP address to the mobile terminal via a network providing an Internet telephony service.

The message exchange between the mobile terminal and the Internet phone may be achieved using a messaging service, such as SMS. In an exemplary implementation, the message exchange service is not limited to the SMS. Accordingly, various types of massaging services may be used for message exchange between the mobile terminal and the Internet phone.

Data synchronization procedures between the mobile terminal and the Internet phone according to exemplary embodiments of the present invention are described with reference to FIGS. 2 and 3. However, the present invention is not limited thereto, but may be implemented with various data synchronization procedures.

Figure 2:
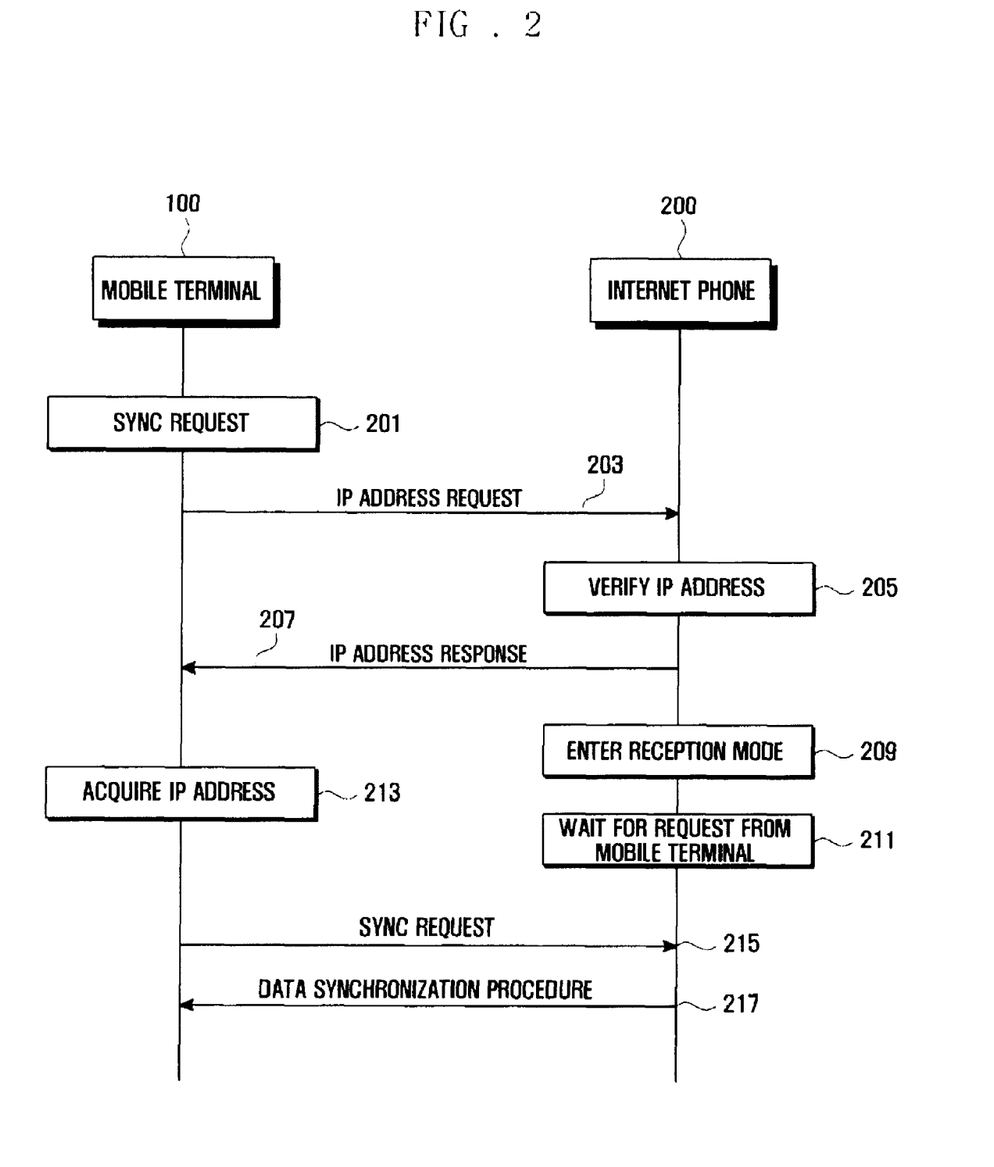
FIG. 2 is a sequence diagram illustrating operations of a mobile terminal and an Internet phone in a data synchronization system according to an exemplary embodiment of the present invention.

FIG. 2 is a sequence diagram illustrating operations of a mobile terminal and an Internet phone in a data synchronization system according to an exemplary embodiment of the present invention.

Referring to FIG. 2, it is assumed herein that the Internet phone 200 is assigned a static or a dynamic IP address for the purpose of identification within a network. The mobile terminal 100 receives the IP address of the Internet phone 200 through a message exchange procedure predefined between the mobile terminal 100 and the Internet phone 200.

The mobile terminal 100 detects a synchronization request input by a user in step 201. The synchronization request may be generated by means of a series of menu selections or a predefined function key.

Once a synchronization request is detected, the mobile terminal 100 transmits an IP address request message to the Internet phone 200 in step 203. As aforementioned, the IP address messages may be exchanged through a predefined message exchange procedure.

When the synchronization request is detected, the mobile terminal 100 may generate the IP address request message in a Short Messaging Service (SMS) message format and transmit the IP address request message to the Internet phone 200. The mobile terminal 100 may be configured to retrieve a predefined phone number of the Internet phone 200 and make a call to the phone number automatically or receive a phone number input by a user and make a call according to the user's manipulation. A header of the IP address request message may include message type information indicating that the message is the IP address request message. The message type information is information predefined between the mobile terminal 100 and the Internet phone 200.

Upon receipt of the IP address request message, the Internet phone 200 verifies the message type information contained in the message header and recognizes the IP address request message and verifies its own IP address in step 205.

The Internet phone 200 then transmits an IP address response message containing its own IP address to the mobile terminal 100 in response to the IP address request message in step 207. The IP address response message is transmitted according to the message exchange procedure predefined between the mobile terminal 100 and the Internet phone 200.

When an IP address request message is transmitted, the Internet phone 200 generates an IP address response message containing its own IP address and transmits the IP address response message by means of the SMS. The Internet phone 200 may be configured to generate and transmit the IP address response message with its IP address automatically in response to the IP address request message. The header of the IP address response message may include the message type information indicating that the message is the IP address response message. The message type information may be the information predefined between the mobile terminal 100 and the Internet phone 200.

After transmitting the IP address response message, the Internet phone 200 transitions to a reception mode in step 209 and waits for receiving a synchronization request message from the mobile terminal 100 in step 211.

Upon receipt of the IP address response message, the mobile terminal 100 parses the IP address response message and acquires the IP address of the Internet phone 200 from the IP address response message in step 213.

Once the IP address of the Internet phone 200 is acquired, the mobile terminal 100 may perform the data synchronization with the Internet phone 200. After acquiring the IP address of the Internet phone 200, the mobile terminal 100 transmits a synchronization request message to the IP address of the Internet phone 200 in step 215.

Upon receipt of the synchronization request message, the Internet phone 200 transmits a synchronization response message to the mobile terminal 200 and the data synchronization procedure is then performed between the mobile terminal 100 and the Internet phone 200 by using a Synchronization Markup Language (SyncML) in step 217.

Here, the SyncML-based synchronization procedure between the mobile terminal 100 and the Internet phone 200 corresponds to a conventional client-server synchronization procedure using SyncML. Since the data synchronization procedure between two devices using the SyncML is well known, a detailed description of the synchronization procedure is omitted herein. The data synchronization method according to an exemplary embodiment of the present invention provides acquisition of a static/dynamic IP address of the Internet phone 200 through a message exchange predefined between the mobile terminal 100 and the Internet phone 200 and sharing data between the mobile terminal 100 and the Internet phone 200 directly using the IP address of the Internet phone 200.

Figure 3:
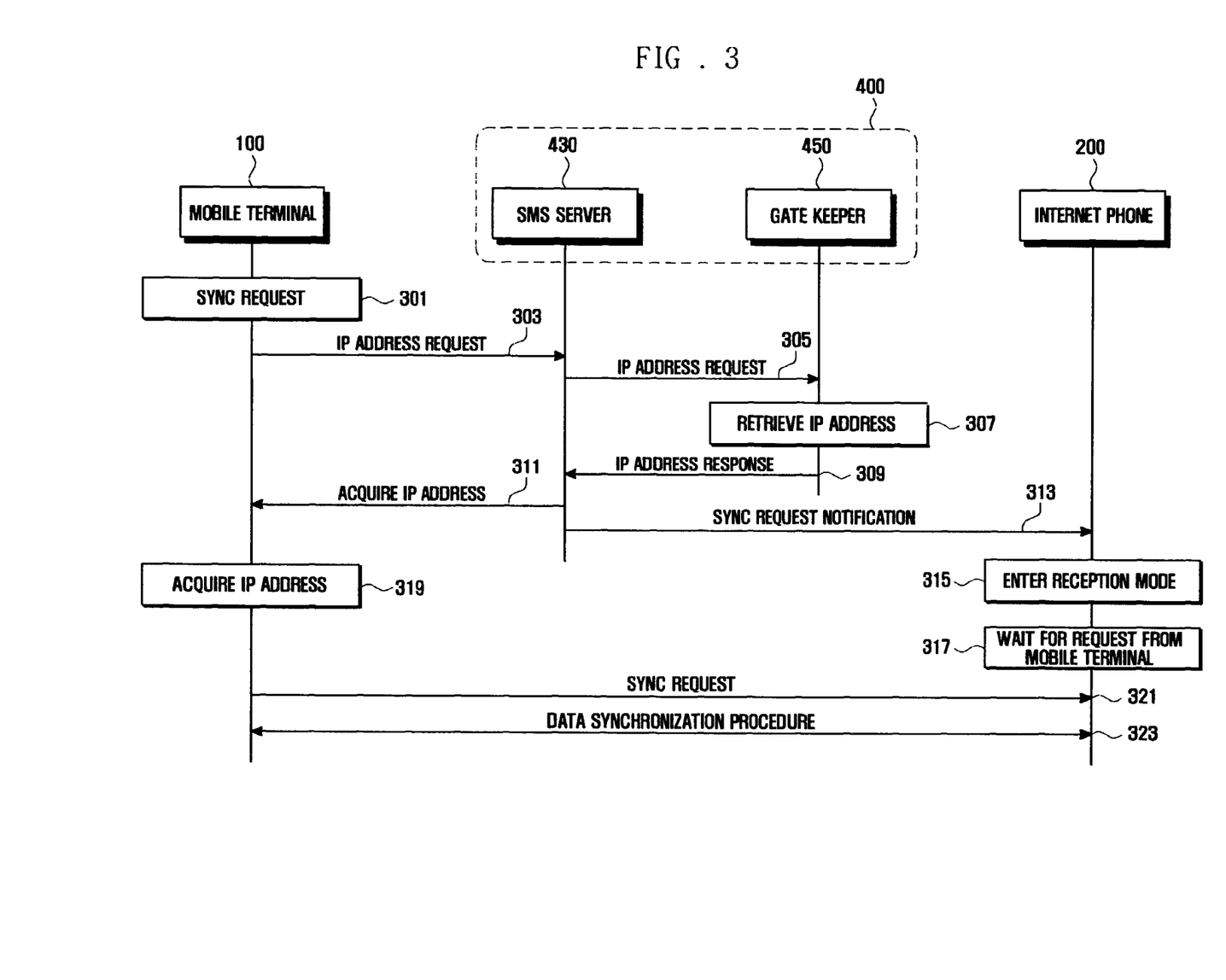
FIG. 3 is a sequence diagram illustrating operations of a mobile terminal and an Internet phone connected to a network in a data synchronization system according to an exemplary embodiment of the present invention.

FIG. 3 is a sequence diagram illustrating operations of a mobile terminal and an Internet phone connected to a network in a data synchronization system according to an exemplary embodiment of the present invention.

Referring to FIG. 3, the mobile terminal 100 acquires an IP address of the Internet phone 200 through a network supporting an Internet phone service. Here, the IP address of the Internet phone 200 may be a static/dynamic IP address for providing the Internet phone with a universally unique identification. More particularly, the IP address of the Internet phone 200 may be a virtual/private IP address that does not provide universal identification.

The Internet phone 200 may be assigned a static/dynamic IP address when it is connected to the Internet directly and a virtual/private IP address when it connected to the Internet via an IP sharing device.

In an exemplary implementation, it is assumed herein that the Internet phone 200 is assigned a virtual/private IP address by an IP sharing device which forms a virtual/private network with a static/dynamic IP address assigned by an Internet Service Provider (ISP). In this case, the Internet phone 200 cannot be identified by its virtual/private IP address outside the virtual/private network.

Still referring to FIG. 3, the mobile terminal 100 acquires the IP address of the Internet phone 200 through a message exchange procedure with a network 400 providing the Internet phone service. The Internet phone 200 uses a virtual/private IP address assigned by an IP sharing device (not illustrated). The network 400 includes an SMS server 430 and a gatekeeper 450, and assigns a static/dynamic IP address to the IP sharing device.

In more detail, the network 400 verifies the IP address assigned to the IP sharing device to which the Internet phone 200 is connected in response to the IP address request message transmitted by the mobile terminal 100 and transmits the IP address of the IP sharing device to the mobile terminal 100 by means of a predefined response message. The predefined response message includes the IP address of the IP sharing device and a port number of the IP sharing device that is assigned for the Internet phone 200. That is, the IP address includes the static/dynamic IP address assigned to the IP sharing device and the IP sharing device's port number assigned to the Internet phone 200. The mobile terminal 100 may connect to the Internet phone 200 via the IP sharing device's port assigned for the Internet phone 200 using the virtual/private IP.

In an exemplary implementation, the network 500 acquires the virtual/private IP address of the Internet phone 200 that is assigned randomly by the IP sharing device and provides the mobile terminal 100 with the acquired virtual/private IP address of the Internet phone 200. In this case, the IP sharing device may fix the virtual/private IP address assigned to the Internet phone 200 temporarily under the control of the network 400, such that the mobile terminal 100 connects to the Internet phone 200 using the virtual/private IP address.

The operations of the mobile terminal 100, the IP phone 200 and the network 400 are described hereinafter in more detail with reference to FIG. 3.

Referring to FIG. 3, the mobile terminal 100 detects a data synchronization request input by a user in step 301. The data synchronization request is input by a menu selection or a function key selection.

Once the data synchronization request is detected, the mobile terminal 100 transmits an IP address request message to the network 400 to request for the IP address of the Internet phone 200 in step 303. The IP address request message is transmitted in a predefined message format.

When the data synchronization request is detected, the mobile terminal 100 generates an IP address request message in an SMS message format to request for the IP address of the Internet phone 200 and transmits the IP address request message to the SMS server 430 of the network 400. The mobile terminal 100 may be configured to retrieve a predefined phone number of the Internet phone 200 and make a call to the phone number automatically or receive a phone number input by the user and make a call according to a user's manipulation. A header of the IP address request message may include message type information indicating that a message is the IP address request message.

When the IP address request message destined to the Internet phone 200 is delivered, the network 400 may intercept the IP address request message. The network 400 is an Internet phone service network and includes an SMS server 430 and a gate keeper 450.

When the IP address request message destined to the Internet phone 200 is received, the SMS server 430 may request for authentication of the mobile terminal 100. If the mobile terminal 100 is authenticated, the SMS server 430 delivers the IP address request message to the gate keeper 450 in step 305.

At this time, the SMS server 430 may verify the IP address request message by verifying the message type information contained in the message header and request the gate keeper 450 for the IP address matched with the phone number of the Internet phone 200.

The gate keeper 450 is a control server for providing the Internet phone service. More particularly, the gate keeper 450 includes a mapping table in which the IP addresses and phone numbers of the Internet phone service subscribers processes a query for a destination IP address. If the Internet phone 200 belongs to a virtual/private network represented by an IP sharing device (not illustrated), the gate keeper 450 manages the static/dynamic IP address assigned to the IP sharing device along with a port number which the IP sharing device has assigned to the Internet phone 200.

Upon receipt of the IP address request message, the gate keeper 450 retrieves the IP address matched with the phone number of the Internet phone 200 in step 307. At this time, the gate keeper 450 may retrieve the static/dynamic IP address assigned to the Internet phone 200 or the static/dynamic IP address assigned to the IP sharing device to which the Internet phone 200 is connected along with the port number assigned to the Internet phone by the IP sharing device, depending on a connection implementation.

If the Internet phone 200 uses a static/dynamic IP address, the gate keeper 450 retrieves the static/dynamic IP address assigned to the Internet phone 200. Whereas, if the Internet phone uses a virtual/private IP address assigned by an IP sharing device, the gate keeper 450 retrieves the port number or the virtual/private IP address of the Internet phone 200 along with the static/dynamic IP address assigned to the IP sharing device.

After retrieving the IP address matched with the phone number of the Internet phone 200, the gate keeper 450 transmits an IP address response message including the retrieved IP address to the SMS server 430 in step 309. As aforementioned, the IP address may be one of the static/dynamic IP address assigned to the Internet phone 200, a combination of the static/dynamic IP address of the IP sharing device and the port number assigned to the Internet phone 200, and the combination of the static/dynamic IP address of the IP sharing device and the virtual/private IP address assigned to the Internet phone 200, depending on the connection.

Upon receipt of the IP address response message, the SMS server 430 forwards the IP address response message to the mobile terminal 100 in response to the IP address request message transmitted by the mobile terminal 100 in step 311.

As aforementioned, the IP address response message carries one of the static/dynamic IP address assigned to the Internet phone 200, a combination of the static/dynamic IP address of the IP sharing device and the port number assigned to the Internet phone 200, and the combination of the static/dynamic IP address of the IP sharing device and the virtual/private IP address assigned to the Internet phone 200 and is transmitted in a predefined message format.

That is, the IP address of the Internet phone 200 is received from the gate keeper, the SMS server 430 generates an IP address response message including the IP address of the Internet phone 200 in an SMS message format and transmits the IP address response message to the mobile terminal 100. At this time, the SMS server 430 may verify the phone number of the mobile terminal 100 contained in the IP address request message and make a call to the mobile terminal 100. Also, the header of the IP address response message may include message type information indicating that the message is an IP address response message.

After the transmission of the IP address response message, the SMS server 430 transmits to the Internet phone 200 a synchronization request notification message to notify the Internet phone 200 that the mobile terminal 100 requests data synchronization in step 313. The synchronization request notification message is transmitted to the Internet phone 200 in a predefined format, e.g. an SMS message format.

Upon receipt of the synchronization request notification message, the Internet phone 200 transitions to the reception mode in step 315 and waits for receiving a synchronization request message from the mobile terminal 100 in step 317.

The mobile terminal 100 received the IP address response message from the SMS server 430 parses the IP address response message to acquire the IP address of the Internet phone 200 in step 319. The IP address extracted from the IP address response message may be one of the static/dynamic IP address of the Internet phone 200, a combination of the static/dynamic IP address of the IP sharing device and a port number assigned to the Internet phone, and a combination of the static/dynamic IP address of the IP sharing device and the virtual/private IP address assigned by the IP sharing device, depending on the connection.

Once the IP address of the Internet phone 200 is acquired, the mobile terminal 100 may perform the data synchronization procedure.

After acquiring the IP address of the Internet phone 200 from the IP address response message, the mobile terminal 100 connects to the Internet phone 200 with the acquired IP address and transmits a synchronization request message to the Internet phone 200 in step 321. If the Internet phone 200 is connected to the network 400 via an IP sharing device, the mobile terminal 100 may connect to the Internet phone 200 via the IP sharing device by using the static/dynamic IP address acquired from the IP address response message and the IP sharing device's port number assigned to the Internet phone 200 and request the Internet phone for the data synchronization.

With a receipt of a reply in response to the synchronization request message, the mobile terminal 100 performs the data synchronization procedure with the Internet phone 200 in step 323.

Here, the data synchronization procedure between the mobile terminal 100 and the Internet phone 200 corresponds to a conventional SyncML-based client/server synchronization procedure. Since the data synchronization procedure between two devices using the SyncML is well known, a detailed description of the synchronization procedure is omitted herein. The data synchronization method according to an exemplary embodiment of the present invention provides the acquisition of the IP address of the Internet phone (i.e., at least one of a static/dynamic IP address of the Internet phone 200, a combination of the static/dynamic IP address of the IP sharing device and a port number assigned to the Internet phone, and a combination of the static/dynamic IP address of the IP sharing device and the virtual/private IP address assigned by the IP sharing device) and sharing data between the mobile terminal 100 and the Internet phone 200 directly using the IP address of the Internet phone 200.

A procedure for the mobile terminal 100 acquiring the IP address of the Internet phone for data synchronization and the structure of a system for data synchronization are described hereinabove. A data synchronization method according to an exemplary embodiment of the present invention is described with detailed operations of the mobile terminal with reference to FIG. 4.

Figure 4:
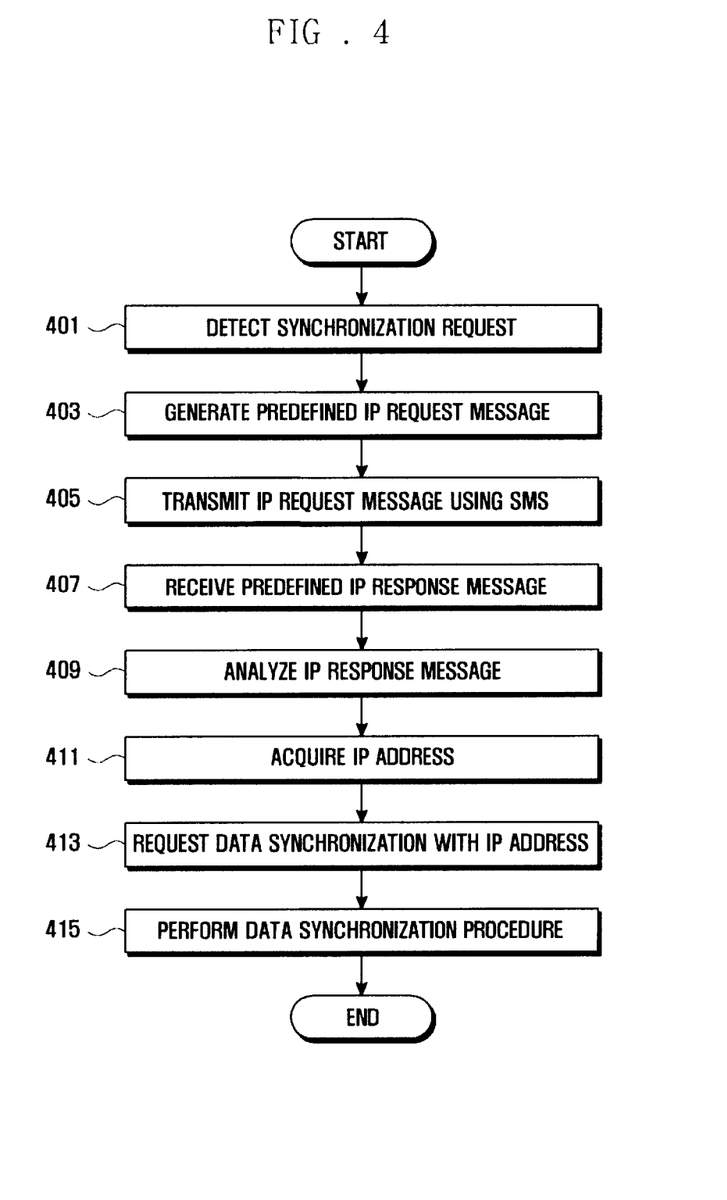
FIG. 4 is a flowchart illustrating a data synchronization method for synchronization between a mobile terminal and an Internet phone according to an exemplary embodiment of the present invention.

FIG. 4 is a flowchart illustrating a data synchronization method for synchronization between a mobile terminal and an Internet phone according to an exemplary embodiment of the present invention.

Referring to FIGS. 2 to 4, the mobile terminal 100 detects a data synchronization request input by the user in step 401. If the data synchronization request is detected, the mobile terminal 100 generates an IP address request message in a predefined format (e.g., SMS message format) in step 403. The mobile terminal 100 then transmits the IP address request message to a phone number of a recipient device in step 405.

Here, the recipient device may be the Internet phone 200 as depicted in FIGS. 2 and 3. The IP address request message may be transmitted to the Internet phone 200 via an Internet phone service network 400.

If the Internet phone 200 is assigned a static/dynamic IP address, the network 400 relays the IP address request message to the Internet phone 200. The Internet phone 200 received the IP address request message generates an IP address response message including its IP address and transmits the IP address response message to the mobile terminal.

If the Internet phone 200 is assigned a virtual/private IP address, i.e., the Internet phone 200 is connected to the network via an IP sharing device, the network 400 intercepts the IP address request message. This IP address request message may also be applied when the Internet phone 200 is assigned the static/dynamic IP address. The network 400 retrieves the IP address matched with the phone number of the Internet phone 200 and transmits the IP address response message including the retrieved IP address to the mobile terminal 100. In this case, the network 400 also transmits a notification message to the Internet phone 200 to notify the Internet phone 200 that the mobile terminal 100 requests data synchronization. Here, the IP address carried by the IP address response message may be one of the static/dynamic IP address assigned to the Internet phone 200, a combination of the static/dynamic IP address of the IP sharing device and the port number assigned to the Internet phone 200, and a combination of the static/dynamic IP address of the IP sharing device and a virtual/private IP address assigned to the Internet phone 200.

After transmitting the IP address request message in step 405, the mobile terminal 100 receives the IP address response message in a predefined format in step 407. As aforementioned, the IP address response message may be generated by the network 400 or the Internet phone 200.

Upon receipt of the IP address response message, the mobile terminal 100 analyzes the IP address response message in step 409 and acquires the IP address of the Internet phone 200 from the IP address response message in step 411.

The mobile terminal 100 then connects to the Internet phone 200 using the acquired IP address, i.e., the IP address of the Internet phone 200, and transmits a data synchronization request message to the Internet phone 200 in step 413. With the receipt of a reply in response to the data synchronization request message, the mobile terminal 100 performs data synchronization with the Internet phone 200 according to a known data synchronization procedure in step 415.

Although the data synchronization method is directed to the mobile terminal in the above description, the present invention is not limited thereto. Accordingly, the data synchronization method may be applicable to all the forms of communication terminals operating with corresponding communication protocols. For instance, the mobile terminal may be replaced by various kinds of information devices, multimedia devices, and the like that support the SyncML and SMS functions.

As described above, the method and system for data synchronization between a mobile terminal and an Internet phone according to exemplary embodiments of the present invention efficiently shares data by minimizing an influence of change of the communication environment and resources.

Also, the method and system for synchronizing data between a mobile terminal and an Internet phone according to exemplary embodiments of the present invention simplify the data synchronization procedure by minimizing any involvement with other network entities.

Further, the method and system for synchronizing data between a mobile terminal and an Internet phone according to exemplary embodiments of the present invention allow the mobile terminal to acquire the IP address of the Internet phone through a predefined signaling procedure between the mobile terminal and Internet phone to synchronize the data directly, thereby simplifying a complex data synchronization procedure, and improving data management efficiency and user convenience.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for synchronizing data between two logical devices, the method comprising:
    transmitting, by a mobile terminal, an Internet Protocol (IP) address request message from a mobile terminal to an Internet phone;
    intercepting, by an Internet phone service network, the IP address request message transmitted by the mobile terminal to the Internet phone;
    transmitting, by the Internet phone service network, an IP address response message including an IP address of the Internet phone to the mobile terminal without further transmitting the IP address request message to the Internet phone;
    receiving, by the mobile terminal, the IP address response message from the Internet phone service network;
    transmitting, by the Internet phone service network, a notification message to the Internet phone informing that the mobile terminal requests data synchronization;
    establishing a connection between the mobile terminal and the Internet phone using the IP address; and
    performing data synchronization between the mobile terminal and the Internet phone through the connection.

2. The method of claim 1, wherein the IP address request message and the IP address response messages comprises Short Messaging Service (SMS) messages.

3. The method of claim 2, wherein the IP address request message comprises message type information for verifying the IP address request message, and the IP address response message comprises message type information for verifying the IP address response message.

4. The method of claim 2, further comprising entering, at the Internet phone, a reception mode for receiving a message from the mobile terminal through the connection after the transmission of the IP address response message.

5. The method of claim 1, wherein the IP address comprises at least one of a static IP address and a dynamic IP address assigned to the Internet phone.

6. The method of claim 1, wherein the transmitting of the IP address request message comprises transmitting the IP address request message from the mobile terminal to the Internet phone service network.

7. The method of claim 6, further comprising:
    entering, at the Internet phone, a reception mode for receiving a message from the mobile terminal upon receipt of the notification message.

8. The method of claim 7, wherein the IP address request message and the IP address response message are exchanged in a predefined message format.

9. The method of claim 7, wherein the network comprises a Short Messaging Service (SMS) server and a gate keeper, the SMS server receives the IP address request message and requests the gate keeper for an IP address matched with a phone number of the Internet phone, the gate keeper retrieves the IP address matched with the phone number of the Internet phone and provides the SMS server with the IP address in response to the request of the SMS server, and the SMS server transmits the IP address response message including the IP address provided by the gate keeper to the mobile terminal.

10. The method of claim 9, wherein the IP address comprises at least one of a static/dynamic IP address assigned to the Internet phone and a combination of an IP address of an IP sharing device to which the Internet phone is connected, and a virtual/private IP address assigned to the Internet phone by the IP sharing device.

11. The method of claim 10, wherein the IP address of the IP sharing device comprises a static/dynamic IP address and a port number assigned to the Internet phone.

12. The method of claim 1, wherein the receiving of the IP address response message comprises:
    receiving, when the Internet phone uses a static/dynamic IP address, the IP address response message comprising the static/dynamic IP address of the Internet phone from the network to the mobile terminal.

13. The method of claim 1, wherein the receiving of the IP address response message comprises:
receiving, when the Internet phone uses a virtual/private IP address, the IP address response message comprising a static/dynamic IP address of an IP sharing device to which the Internet phone is connected and a port number assigned to the Internet phone by the IP sharing device.

14. The method of claim 1, wherein the receiving of the IP address response message comprises:
receiving, when the Internet phone uses a virtual/private IP address, the IP address response message comprising a virtual/private IP address of the Internet phone which is assigned by the IP sharing device.

15. The method of claim 1, wherein the mobile terminal transmits the IP address request message to the destination upon receiving a user input requesting synchronization with the Internet phone.

16. A system for synchronizing data between two logical devices, the system comprising:
a mobile terminal for transmitting an IP address request message to a destination in response to a synchronization request, for connecting, when the IP address is acquired in response to the IP address request message, to the destination corresponding to the IP address, and for performing a data synchronization procedure with the destination;
an internet phone terminal for performing the data synchronization procedure with the mobile terminal connected using the IP address; and
a network for intercepting the IP address request message transmitted by the mobile terminal such that the Internet phone service network does not further transmit the IP address request message to the Internet phone, for transmitting, to the mobile terminal that transmitted the IP address request message, the IP address response message including the IP address of the Internet phone, and for transmitting to the Internet phone a notification message informing that the mobile terminal requests data synchronization.

17. The system of claim 16, wherein the network transmits a notification message to the Internet phone to inform the Internet phone of a data synchronization request by the mobile terminal.

18. The system of claim 17, wherein the Internet phone enters, when at least one of the IP address request message and the notification message is received, a reception mode to receive an access request of the mobile terminal.

19. The system of claim 17, wherein the IP address request message and the IP address response message are exchanged via a messaging service.

20. The system of claim 17, wherein the network comprises:
a Short Messaging Service (SMS) server for intercepting the IP address request message, for requesting an IP address matched with a phone number of the Internet phone, and for transmitting, when the IP address of the Internet phone is acquired, the IP address response message including the IP address to the mobile terminal; and
a gate keeper for retrieving the IP address matched with the phone number of the Internet phone in response to the request by the SMS server and for providing the retrieved IP address to the SMS server.

21. The system of claim 17, wherein the IP address response message comprises at least one of a static/dynamic IP address assigned to the Internet phone, and a combination of an IP address of an IP sharing device to which the Internet phone is connected and a virtual/private IP address assigned to the Internet phone by the IP sharing device.

22. The system of claim 17, wherein the IP address of the Internet phone comprises at least one of a static/dynamic IP address, and a combination of a static/virtual IP address assigned to an IP sharing device to which the Internet phone is connected and a port number assigned to the Internet phone by the IP sharing device.

23. The system of claim 22, wherein the IP address request message is transmitted from the mobile terminal to the Internet phone and the IP address response message is transmitted from the Internet phone to the mobile terminal when the Internet phone uses the static/dynamic IP address, the IP address response message comprising the static/dynamic IP address of the Internet phone.

24. The system of claim 22, wherein the IP address request message is transmitted from the mobile terminal to the network and the IP address response message is transmitted from the network to the mobile terminal when the Internet phone uses the static/dynamic IP address, the IP address response message comprising the static/dynamic IP address of the Internet phone.

25. The system of claim 22, wherein the IP address request message is transmitted from the mobile terminal to the network and the IP address response message is transmitted from the network to the mobile terminal when the Internet phone uses the virtual/private IP address, the IP address response message comprising the static/dynamic IP address of the IP sharing device and the port number assigned to the Internet phone by the IP sharing device.

26. The system of claim 22, wherein the IP address request message is transmitted from the mobile terminal to the network and the IP address response message is transmitted from the network to the mobile terminal when the Internet phone uses the virtual/private IP address, the IP address response message comprising the virtual/private IP address assigned to the IP phone as the destination of the IP address request message.

27. The system of claim 16, wherein the mobile terminal transmits the IP address request message to the destination upon receiving a user input requesting synchronization with the Internet phone.

* * * * *